| [54] | DOOR BELL FOR PETS |
|---|---|
| [76] | Inventor: George William Moore, Moorecroft, Ash Yard, Sharrington, Melton Constable Norfolk NR24 2PH, United Kingdom |
| [21] | Appl. No.: 09/117,720 |
| [22] | PCT Filed: Feb. 6, 1997 |
| [86] | PCT No.: PCT/GB97/00333 |
| | § 371 Date: Aug. 5, 1998 |
| | § 102(e) Date: Aug. 5, 1998 |
| [87] | PCT Pub. No.: WO97/29462 |
| | PCT Pub. Date: Aug. 14, 1997 |
| [30] | Foreign Application Priority Data |

Feb. 10, 1996 [GB] United Kingdom .................. 9602746
Jul. 23, 1996 [GB] United Kingdom .................. 9615468

[51] Int. Cl.⁷ .................................................. G08B 23/00
[52] U.S. Cl. .............................. 340/573.1; 340/286.11; 340/328
[58] Field of Search .............................. 340/573.1, 573.3, 340/328, 330, 286.11, 665, 666, 539; 119/174

[56] References Cited

U.S. PATENT DOCUMENTS

| | | | |
|---|---|---|---|
| 4,323,883 | 4/1982 | Sowards | 340/328 |
| 4,400,696 | 8/1983 | Klingensmith | 340/573.3 |
| 4,551,713 | 11/1985 | Aossey | 340/573.3 |
| 4,686,504 | 8/1987 | German | 340/573.3 |
| 4,777,474 | 10/1988 | Clayton | 340/539 |
| 4,924,214 | 5/1990 | Hill | 340/666 |
| 5,264,824 | 11/1993 | Hour | 340/384 |
| 5,303,677 | 4/1994 | Jones | 340/286.11 |
| 5,369,907 | 12/1994 | Lee | 43/98 |
| 5,475,369 | 12/1995 | Baker | 340/573.3 |
| 5,604,478 | 2/1997 | Grady et al. | 340/573.3 |

*Primary Examiner*—Jeffery A. Hofsass
*Assistant Examiner*—John Tweel, Jr.
*Attorney, Agent, or Firm*—Edwin D. Schindler

[57] ABSTRACT

A door bell for pets has an activating unit and a bell, or buzzer, unit. The activating unit, in a preferred embodiment, includes a base plate with a device for fixing it to the ground and a housing cover forming a major portion of the top surface of the housing. The housing cover is coupled to a floating platform depressible relative to the base plate for effecting operation of a limited range radio transmitter, which transmits a signal to cause operation of the bell unit.

9 Claims, 5 Drawing Sheets

DOOR BELL FOR PETS

This invention relates to a door bell for pets, especially dogs and cats and more especially dogs.

When pets are released into the garden and return to be let into the house, it is not uncommon for the animal to scratch and over a period of time damage the door. The problem can be overcome in the case of cats by means of so-called cat flaps, but this is not a practical solution for many dogs, especially large dogs.

U.S. Pat. No. 4,924,214 discloses a door mat alarm having a matrix of pressure switches incorporated therein, whereby when the mat is stepped upon a transmitter is activated to operate an alarm.

According to one aspect of the invention, there is provided a door bell for pets comprising two units in the form of an activating unit incorporating a radio transmitter for transmitting a limited range operating signal for a remote bell unit incorporating a receiver and a bell or buzzer, characterised in that the activating unit comprises a housing having a base plate provided with means for securing it to the ground and a main housing part detachably fitting to the base plate, the housing having on top a depressible platform occupying at least a major part of the top surface area of the housing and depression of which causes the radio transmitter to transmit the operating signal.

Preferably, the platform covers the entirety of the top surface area of the housing of the activating unit.

The platform is preferably provided with an antislip surface.

The base unit may be securable to the ground, by elongate slots engageable beneath the heads of two screws inserted into a doorstep or other ground surface adjacent the door. The main part of the housing may detachably fit to the base unit, either directly or via a floating intermediate plate, so as to be depressible relative to the base unit.

In one embodiment, the platform takes the form of a cover hinged on one side to the main part of the housing.

In another embodiment, the cover part of the housing, having the platform as its top wall, floats on one or more springs interposed between a bottom wall of said housing part and the base unit.

According to a second aspect of the invention, there is provided a door bell for pets comprising two units in the form of an activating unit incorporating a radio transmitter for transmitting a limited range operating signal for a remote bell unit incorporating a receiver and a bell or buzzer, characterised in that the activating unit comprises a housing having a base unit for securing to the ground, a floating plate supported on the base unit, and a cover having the platform on its upper side, said cover being coupled to the floating plate and depression of the cover causing the radio transmitter to transmit the operating signal.

The housing preferably encloses a switch, e.g. contact pair, operable by depression of the platform, battery compartment and the transmitter. The battery compartment may conveniently be exposed by detaching the main part of the housing from the base unit or floating plate, or, for example, by hinging open the platform when the latter takes the form of a hinged cover. When a floating plate is employed, the switch may be interposed either between the base unit and the housing cover or between the base unit and the floating plate or directly between the base unit and the transmitter when the latter is supported on the floating plate.

When a hinged cover is employed, this may be held closed in a depressible condition by a slot and spring detent means on the side opposite to the hinge.

The bell unit is preferably devoid of means for fixing, as it is intended to be portable from room to room in the house, or even into a shed, garage or garden.

The bell unit may also have an openable compartment, preferably on its underside, for housing not only the battery but also a code switch, the latter being set to avoid activation of a neighbour's bell. The unit may also have an exposed volume control.

Further features of the invention will be apparent from the following description of a practical embodiment of pets' door bell, described by way of example with reference to the accompanying drawings, in which.

Figures 1, 2:
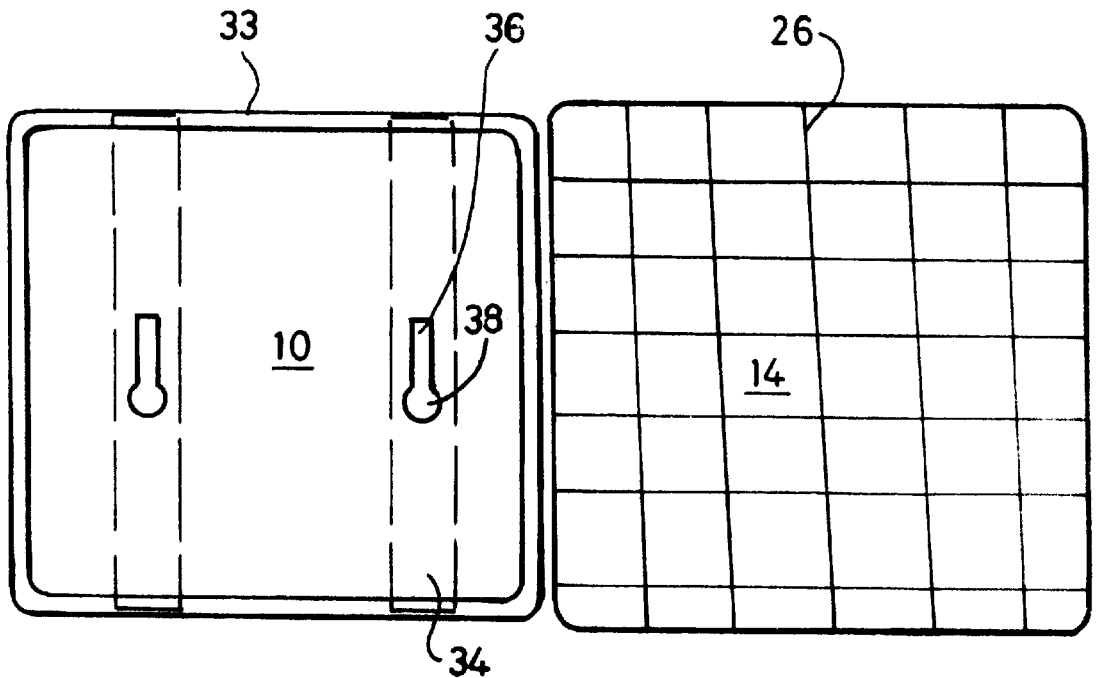
FIGS. 1 to 4 show the activating unit in underside, top, side and front views, respectively.

Referring to FIGS. 1 to 4 of the drawings, the activating unit comprises a right rectangular housing, generally square in plan. This housing is preferably moulded of plastics material and comprises a base plate 10, main housing portion 12 which clips together with the base plate, and a cover 14 which is hinged to the main portion on one side, as indicated at 16, and secures in a depressible condition to the main portion on the opposite side, as indicated by the slot 18 and depressible, spring detent element 20.

Figure 3:
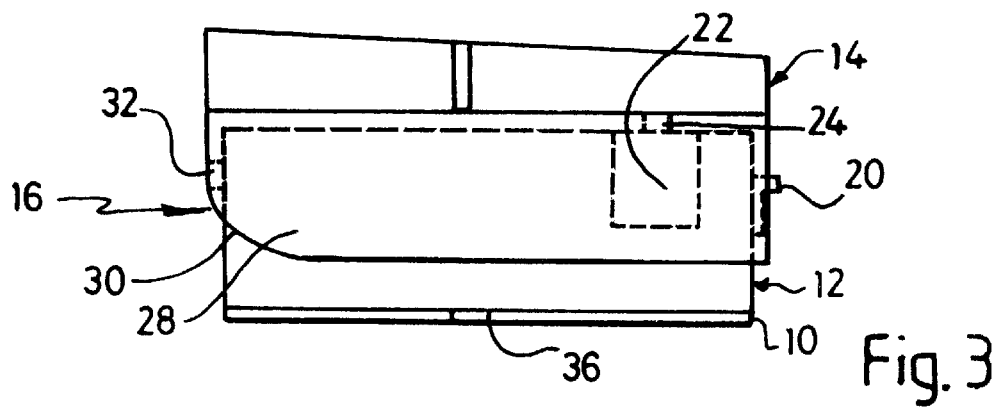
Figure 4:
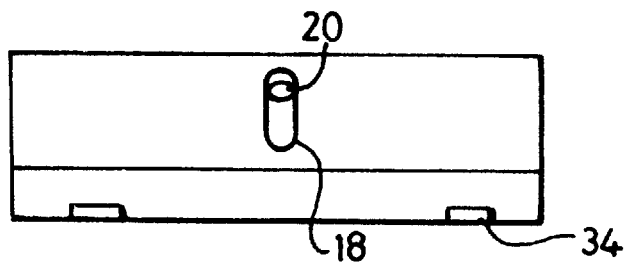

By means of the detent element 20, the cover can be opened to expose a compartment 22 accommodating a spring loaded switch-operating element 24, a limited range radio transmitter and batteries. Normally, however, the cover is held in closed but depressible condition by the detent element 20. In FIG. 3, the cover is shown in a depressed condition.

The cover 14, which extends over the entire surface area of the top of the housing, is ribbed as indicated at 26 or otherwise formed with an anti-slip surface.

It will be noted that the cover has wings 28 which encompass the main portion 12 of the housing, and in conjunction therewith a rolled formation 30 which cooperates with an externally raised moulding 32 on the main portion to define the hinge. On the opposite side, the relevant wing incorporates the slot 18, and the depressible detent element may be moulded as a flexible leaf on the main portion 12.

The base plate 10, which snap fits or clips to the main portion 12 of the housing by means of lip 33 is best seen in FIG. 1. It is moulded with internal rails 34 which incorporate elongate slots 36 with eyeholes 38, enabling the assembled housing to be secured under the heads of two screws fixed into the doorstep or to the ground adjacent a house door.

Figure 5:
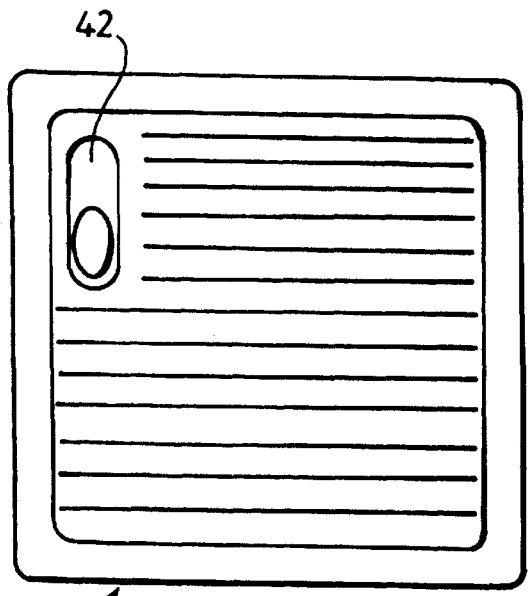
FIGS. 5, 6 and 7 show the bell unit in side, front and underside views, respectively.
Figure 6:
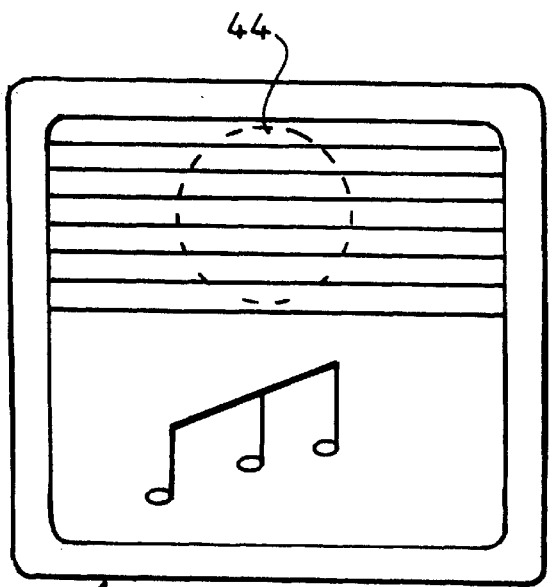
Figure 7:
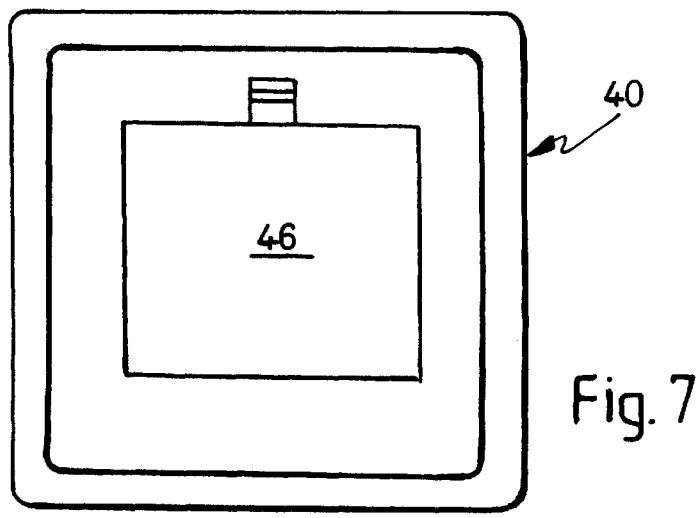

The bell unit shown in FIGS. 5 to 7 is conveniently a cubic shaped housing 40, devoid of fixing means as it is intended to be fully portable for carrying from room to room in the house or out into the garden. It has a combined switch and volume control 42 on one side, a front loudspeaker 44, and an underside openable compartment 46 for accommodating batteries and a code switch which can be set to avoid operation of a neighbour's bell unit (which may be a conventional radio door bell).

Figure 8:
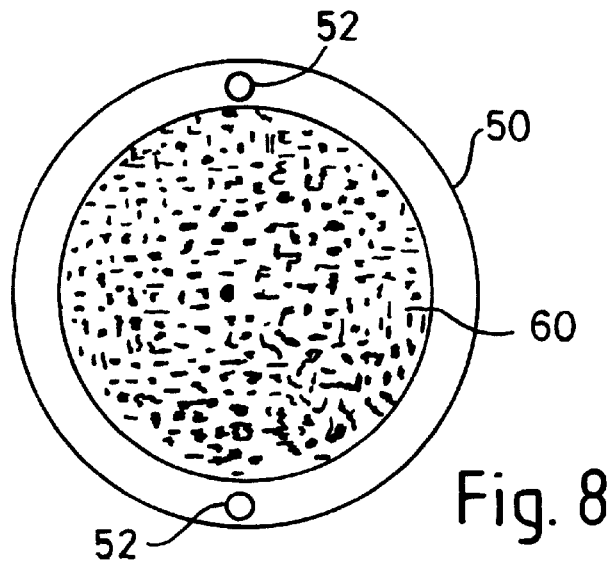
FIGS. 8, 9 and 10 show an alternative construction of activating unit.
Figure 9:
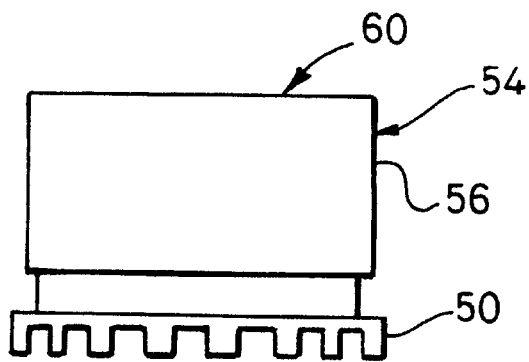
Figure 10:
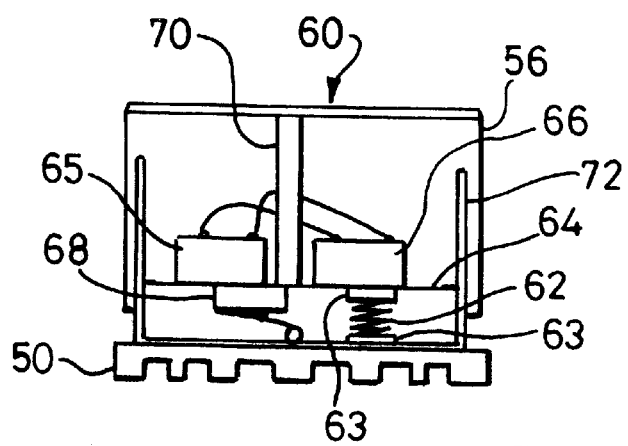
Figure 11:
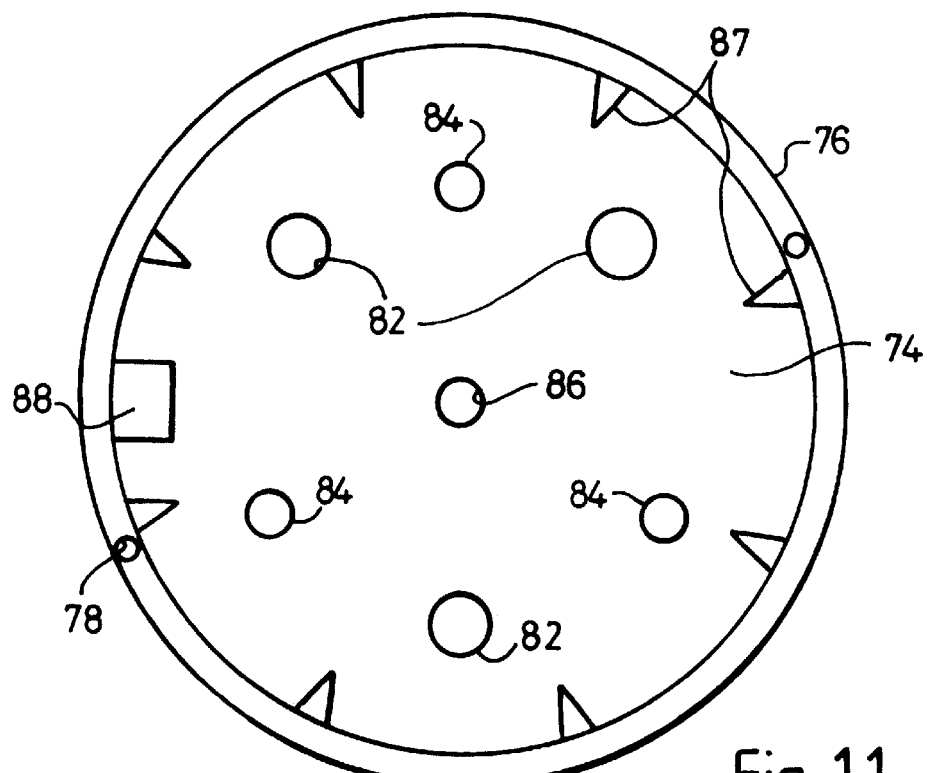
FIGS. 11 to 14 show a preferred construction of activating unit.

Referring now to FIGS. 8 to 10, the modified activating unit is generally round instead of square. The base plate 50, vented on the underside, fixes to the doorstep or the like through two fixing holes 52, and the main part 54 of the housing, including a cover 56 having the platform with uneven, antislip surface 60 as its top wall, floats on three springs 62 interposed between guides 63 on the base plate 50 and on a circlip-held bottom wall 64 of the housing main part. This main part of the housing also carries a battery 65, limited range transmitter 66 and microswitch 68, this switch being operated by depression of the cover 56, connected by two pins 70 to the bottom wall of the main housing part. An upstanding guide 72 from the base plate 50 ensures linear downward and return movement of the cover 56.

Figure 12:
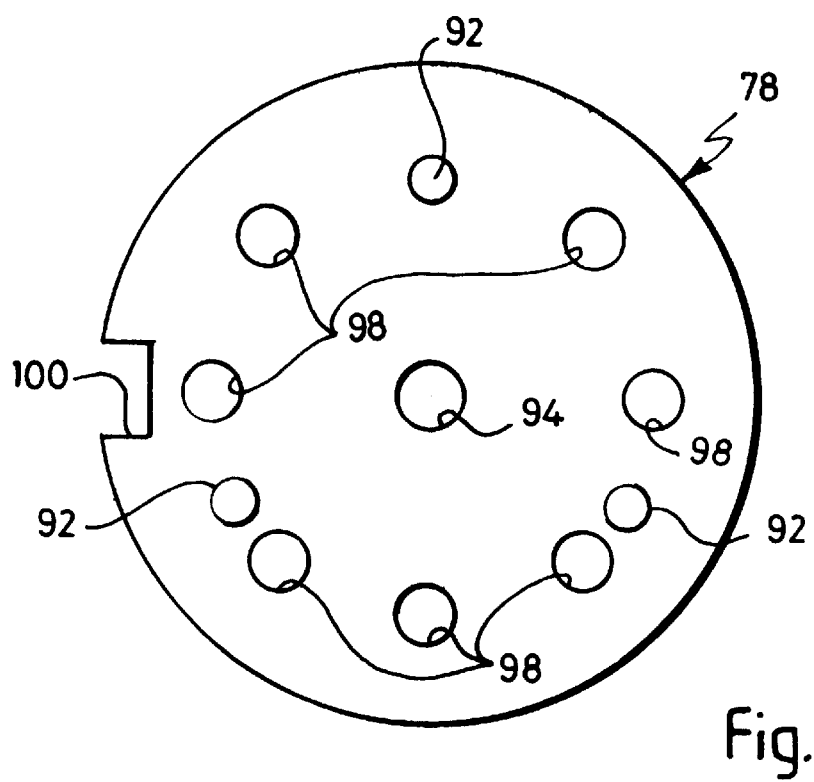
Figure 13:
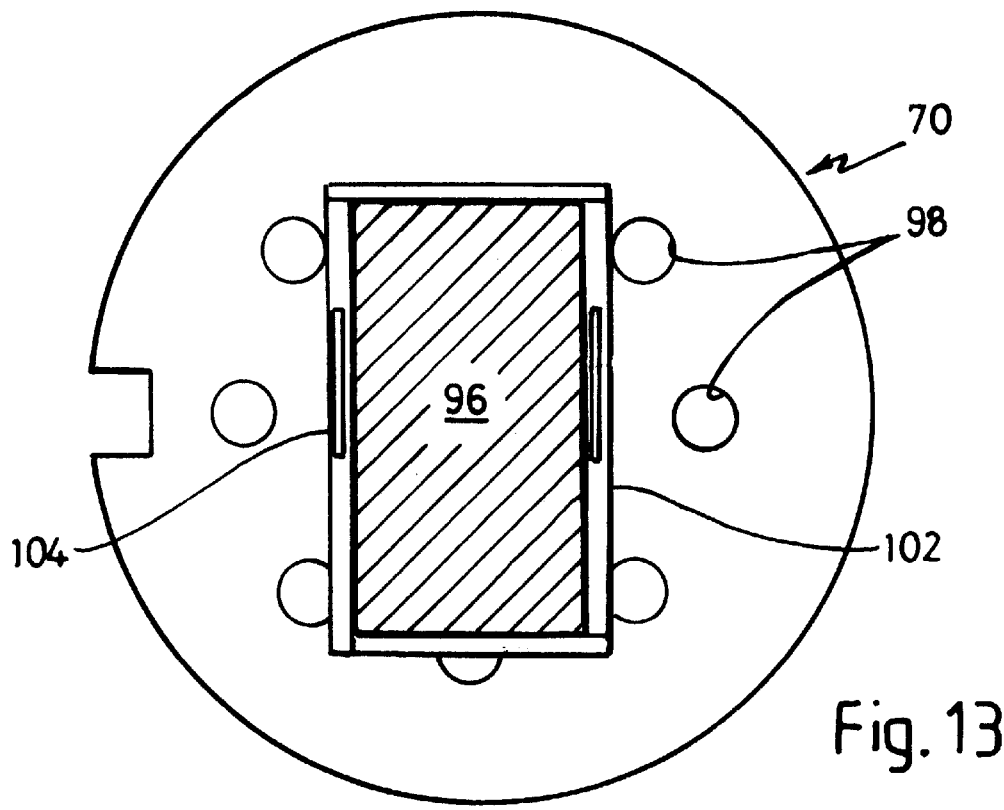
Figure 14:
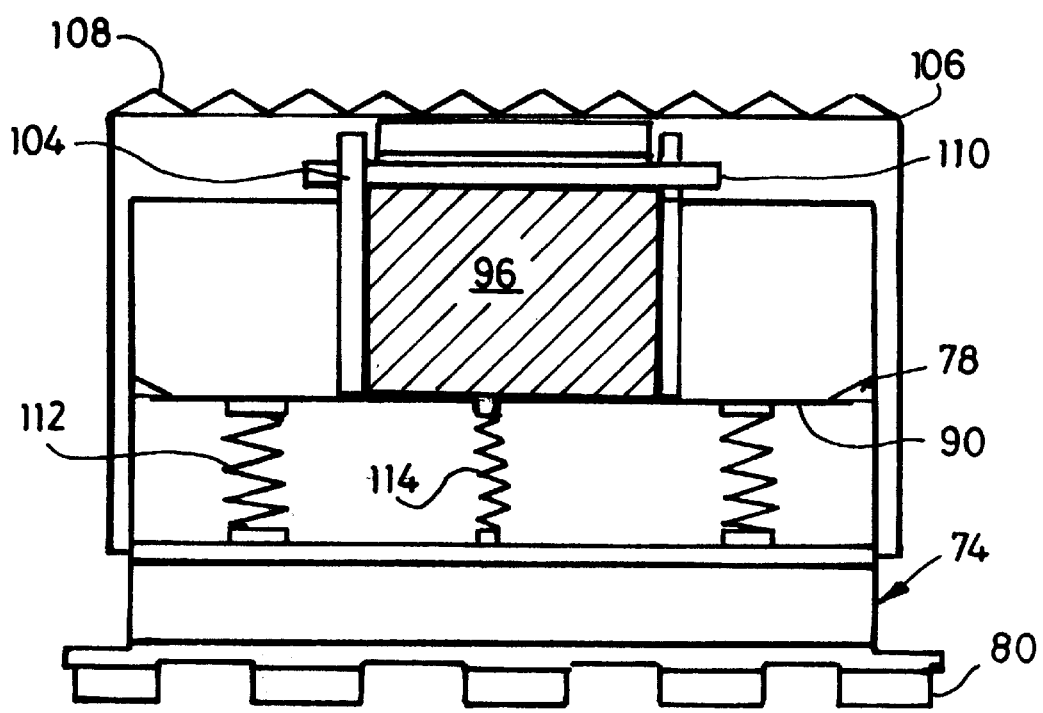

In the preferred arrangement shown in FIGS. 11 to 14, the activating unit comprises a base plate (FIG. 11), a floating platform (FIGS. 12 and 13) and a cover visible in FIG. 14.

The base plate 74 has a rim 76 containing holes 78 for fixing the base plate to the ground, feet 80 (see FIG. 4) for supporting its main undersurface off the ground, vent holes 82, a ring of spring retaining studs 84 and a central spring retaining stud 86. It also has retaining lugs 87 and a retaining lip 88 for the floating platform.

The floating platform 90, of which the underside is shown in FIG. 12 and the top side in FIG. 13, has pins 92 for location of the springs retained on the studs 84, a hole 94 for the spring retained on the stud 86 to pass through to the transmitter 96 (see FIG. 13) for operating same, vent holes 98 and a locating slot 100 for cooperation with the retaining lip 88. The top side of the floating platform 90 supports the transmitter 96 between raised areas 102 which incorporate hooks 104 for retention of the cover 106 (see FIG. 14).

In FIG. 14, the cover 106, with a non-slip upper surface 108, is shown coupled to the floating platform 90 by means of lugs 110 which engage with the hooks 104. This drawing also shows the ring of springs 112 on which the floating platform 90 is supported on the base plate 74 and the central spring 114 which passes through the floating platform 90 to the transmitter 96.

The arrangement of springs 112, 114 ensures operation of the transmitter even if the cover 106 is only depressed near its periphery, whilst at the same time ensuring that no damage to the activating unit, and especially the transmitter, occurs even if the cover is heavily stepped on to cause maximum depression thereof.

In use, it is not anticipated that any problem will arise in training a pet, especially a dog, to use the door bell, as it is relatively commonplace for pets themselves to learn to use door knockers and the like.

Various modifications of the above described and illustrated arrangement are possible within the scope of the invention as defined by the appended claims, especially in respect of the manner in which the displaceable platform is mounted to the housing of the activating unit.

What is claimed is:

1. A door bell for pets, comprising:

two units in the form of an activating unit incorporating a radio transmitter for transmitting a limited range operating signal for a remote bell unit comprising a receiver and a bell or a buzzer, said activating unit comprising:
a housing having a base unit with a main housing part, said housing having a depressible platform on a top surface area occupying, at least, a major part of the top surface area of said housing;
means for securing said base unit to a ground surface, said main housing part being detachably fitted to said base unit;
a plate floating on springs on said base unit, said plate carrying said radio transmitter; and,
a cover having said depressible platform on its upper side, said cover being coupled to said plate with depression of said cover causing said radio transmitter to transmit an operating signal.

2. A door bell according to claim 1 in which the platform covers the entirety of the top surface of the housing of the activating unit.

3. A door bell according to claim 1 in which the platform has an anti-slip surface.

4. A door bell according to claim 1 in which the main housing part carries battery fitting means, limited range transmitter and a switch.

5. A door bell according to claim 1 in which the main part of the housing, including the platform, floats on springs on the base plate and the switch is operated by depression of the main housing part relative to the base plate.

6. A door bell according to claim 1 in which the base unit has feet for supporting its underside spaced off the ground.

7. A door bell according to claim 1 in which the base unit and the floating plate have vent holes.

8. A door bell according to claim 1 in which the floating plate is supported by a ring of outer springs and a centre spring makes contact with the transmitter to cause operation thereof when the cover is depressed.

9. A door bell according to claim 1 in which the bell unit is devoid of fixing means and is intended to be portable within the range of the transmitter of the activating unit.

\* \* \* \* \*